US010330339B2

(12) United States Patent
Kamiya et al.

(10) Patent No.: US 10,330,339 B2
(45) Date of Patent: Jun. 25, 2019

(54) AERODYNAMIC SOUND DECREASING APPARATUS

(71) Applicant: DENSO CORPORATION, Kariya, Aichi-pref. (JP)

(72) Inventors: Masaru Kamiya, Kariya (JP); Koji Ito, Kariya (JP); Shinya Kato, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 127 days.

(21) Appl. No.: 15/599,588

(22) Filed: May 19, 2017

(65) Prior Publication Data

US 2017/0254561 A1    Sep. 7, 2017

Related U.S. Application Data

(62) Division of application No. 13/371,599, filed on Feb. 13, 2012, now abandoned.

(30) Foreign Application Priority Data

Feb. 16, 2011 (JP) .................................. 2011-031171
Oct. 31, 2011 (JP) .................................. 2011-238444

(51) Int. Cl.
| F24F 13/24 | (2006.01) |
| B60H 1/00 | (2006.01) |
| F04D 29/66 | (2006.01) |
| F04D 29/68 | (2006.01) |

(52) U.S. Cl.
CPC ......... *F24F 13/24* (2013.01); *B60H 1/00514* (2013.01); *B60H 1/00564* (2013.01); *F04D 29/663* (2013.01); *F04D 29/681* (2013.01); *B60H 2001/006* (2013.01)

(58) Field of Classification Search
CPC ................. F24F 13/24; F24F 2013/242; F24F 2013/245; F24F 2013/247; B60H 1/00514; B60H 1/00564; B60H 2001/006
See application file for complete search history.

(56) References Cited

U.S. PATENT DOCUMENTS

| 5,518,364 A | 5/1996 | Neise et al. |
| 6,463,230 B1 | 10/2002 | Wargo |
| 2010/0163209 A1 | 7/2010 | Eguchi et al. |
| 2010/0190431 A1 | 7/2010 | Kurniawan et al. |

FOREIGN PATENT DOCUMENTS

| EP | 0659641 A1 | 6/1995 |
| JP | 57-137797 | 8/1982 |
| JP | 2-253000 A | 10/1990 |
| JP | 03-168561 | 7/1991 |
| JP | H05-026762 A | 2/1993 |
| JP | H09-300943 A | 11/1997 |

(Continued)

OTHER PUBLICATIONS

Office Action dated Jul. 1, 2014 in corresponding Japanese Application No. 2011-238444.

*Primary Examiner* — Eric S Ruppert
(74) *Attorney, Agent, or Firm* — Harness, Dickey & Pierce, P.L.C.

(57) ABSTRACT

Multiple projections are provided at a flow-change portion, which corresponds to such a portion of a wall surface of an A/C casing, at which velocity gradient of air current becomes larger in an area adjacent to the wall surface, in order to decrease aerodynamic sound generated by disturbed air current.

5 Claims, 13 Drawing Sheets

(56) References Cited

FOREIGN PATENT DOCUMENTS

| | | | |
|---|---|---|---|
| JP | 2002-228542 | A | 8/2002 |
| JP | 2003-161295 | A | 6/2003 |
| JP | 2004-314794 | A | 11/2004 |
| JP | 2006-151068 | A | 6/2006 |
| JP | 2006-159924 | A | 6/2006 |
| JP | 2006151316 | A | 6/2006 |
| JP | 2008-126730 | A | 6/2008 |
| JP | 2008-207611 | A | 9/2008 |
| JP | 2012-166758 | A | 9/2012 |

AERODYNAMIC SOUND DECREASING APPARATUS

CROSS REFERENCE TO RELATED APPLICATION

This application is a divisional Application of U.S. patent application Ser. No. 13/371,599 filed on Feb. 13, 2012 which claims the benefit and priority priority of Japanese Patent Application No. 2011-031171 filed on Feb. 16, 2011, and No. 2011-238444 filed on Oct. 31, 2011, the disclosures of which are incorporated herein by reference.

FIELD OF THE INVENTION

The present invention relates to an aerodynamic sound decreasing apparatus for decreasing aerodynamic sound generated by turbulence of air flow.

BACKGROUND OF THE INVENTION

It is known in the art, according to which a member or a device for decreasing pressure variation (hereinafter also referred to as a noise decreasing member) is provided on a product surface in order to decrease aerodynamic sound (also referred to as noise) generated in a blower device for blowing out conditioned air or cold air, for example, as disclosed in the following patent publications:
  (1) Japanese Patent Publication No. H02-253000;
  (2) Japanese Patent Publication No. H05-026762;
  (3) Japanese Patent Publication No. H07-225048;
  (4) Japanese Patent Publication No. 2003-161295; and
  (5) Japanese Patent Publication No. 2006-159924.

For example, a structure for providing a plumate or wire-rod-shaped projections or furry and fibrous members is described as the noise decreasing member, in the above patent publications.

In a case that one of the noise decreasing members disclosed in the above patent publications is applied to an air duct of an air conditioning apparatus for a vehicle, wherein the air duct has a bended portion, it is not possible to achieve a sufficient noise decreasing effect. It is difficult to use such noise decreasing member in view of an industrial application, because it may cause a decrease of performance and/or an increase of manufacturing cost.

When the technology disclosed in the above patent publications (1) or (3) is applied to the air conditioning apparatus for the vehicle, it may be necessary to provide a lot of projections in a plume structure on an inner surface so as to break a vortex flow into multiple smaller portions, or it may be necessary to provide small fibrous members in a furry condition (that is, a kind of hair-implant process) so as to softly receive the vortex flow by cushioning action.

A part (a member) of the air conditioning apparatus for the vehicle, which forms a wall of an A/C casing, is generally made of resin by a molding process. Therefore, it may become necessary to add the above kind of the hair-implant process in the resin-molding process. It may cause an increase of the manufacturing cost.

In addition, when the fibrous members may come off due to a secular change, not only the noise reducing effect may be decreased but also the air duct of the air conditioning apparatus may be blocked by such fibrous members or the fibrous members may be blasted off from a duct opening into a passenger compartment to thereby provide an uncomfortable feeling to a vehicle passenger.

In addition, in a case that the technology of the above patent publication (2) is applied to the air conditioning apparatus for the vehicle, it is necessary that a boundary-layer flow partly transits to a turbulent boundary layer in an area adjacent to air blow-out ports and air duct openings. Therefore, it may be necessary to provide a facilitating member on a surface which is in contact with the air flow, so that the boundary-layer flow partly transits to the turbulent boundary layer.

However, since the air conditioning apparatus for the vehicle is composed of multiple complicated air passages, which have a lot of bended portions in the inside thereof, the noises are also generated at such portions other than the air blow-out ports and the air duct openings. Therefore, even when the noise generated in the area adjacent to the air blow-out ports and/or the air duct openings can be decreased, the noise as a whole can not be still sufficiently decreased. Since cold air and hot air is mixed with each other in order to adjust temperature of the air in the air conditioning apparatus for the vehicle, air currents in the inside of the air conditioning apparatus are largely disturbed and those air currents are in a condition of the turbulent flow. If the above facilitating member was provided, the turbulence of the air currents would be further increased and the noise would be increased on the contrary.

In addition, in the case that the noise decreasing members of the above patent publications (1) to (3) were provided in various portions of the air passage for the purpose of decreasing the noise, the noise decreasing members would become resistance for the air flow to thereby cause another problem that a flow rate may be decreased in accordance with an increase of the area, in which the noise decreasing members are provided.

It might be possible to increase rotational speed of a blower unit and to supply the air at a higher pressure so as to compensate the decrease of the flow rate. However, the noise will be correspondingly increased. Namely, the aerodynamic sound for the unit flow rate may be increased.

In addition, in the case that the technology of the above patent publication (4) was applied to the air conditioning apparatus for the vehicle, it would be possible to decrease the noise, which will be generated at portions, such as forward portions of ribs, inside wall surfaces of the bended portions or the like, at which the air currents are separated. However, on the other hand, it would not be possible to decrease the noise which will be generated when the air currents separated at the bended portions or the forward ends of the ribs collide against wall surfaces around them, or the noise which will be generated when the air currents collide against an outer wall surface of the bended portion. Therefore, it is not possible to decrease the noise as a whole. The technology of the patent publication (5) is applied to a reduced portion of the air passage. Therefore, it is not possible to decrease the noise, which will be generated at other portions than the above reduced portion. In other words, even according to the technology of the patent publication (5), it is not possible to decrease the noise as a whole, either.

SUMMARY OF THE INVENTION

The present invention is made in view of the above problems. It is an object of the present invention to provide an aerodynamic sound decreasing apparatus, according to which the aerodynamic sound can be decreased while a decrease of the flow rate can be avoided.

According to a feature of the present invention (for example, as defined in the appended claim 1), in aerodynamic sound decreasing apparatus, an air passage is formed by a passage forming member. An aerodynamic sound decreasing member is provided on a wall surface of the passage forming member for decreasing velocity gradient of an air current, colliding against a portion of the wall surface. The aerodynamic sound decreasing member is provided at such a speed-change portion, at which a shape of the wall surface is changed, and at which the velocity gradient of the air current will be increased in an area adjacent to the wall surface.

According to the above feature, the aerodynamic sound decreasing member for decreasing the velocity gradient is provided at such a portion, at which the velocity gradient will become larger. In other words, the aerodynamic sound decreasing member is provided at such a portion of the wall surface, a shape of which is changed and against which the air current collides. Accordingly, the velocity gradient becomes smaller in the area adjacent to the wall surface, while the velocity gradient is maximized in an area away from the wall surface. As above, vorticity which would cause the noise will be decreased and a maximum vorticity is away from the wall surface, to thereby decrease the noise.

The aerodynamic sound decreasing member is provided not on the whole area of the wall surface of the air passage but on a part thereof. Therefore, manufacturing cost can be reduced. Therefore, it is possible to decrease the noise, while suppressing decrease of flow rate and increase of the manufacturing cost.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
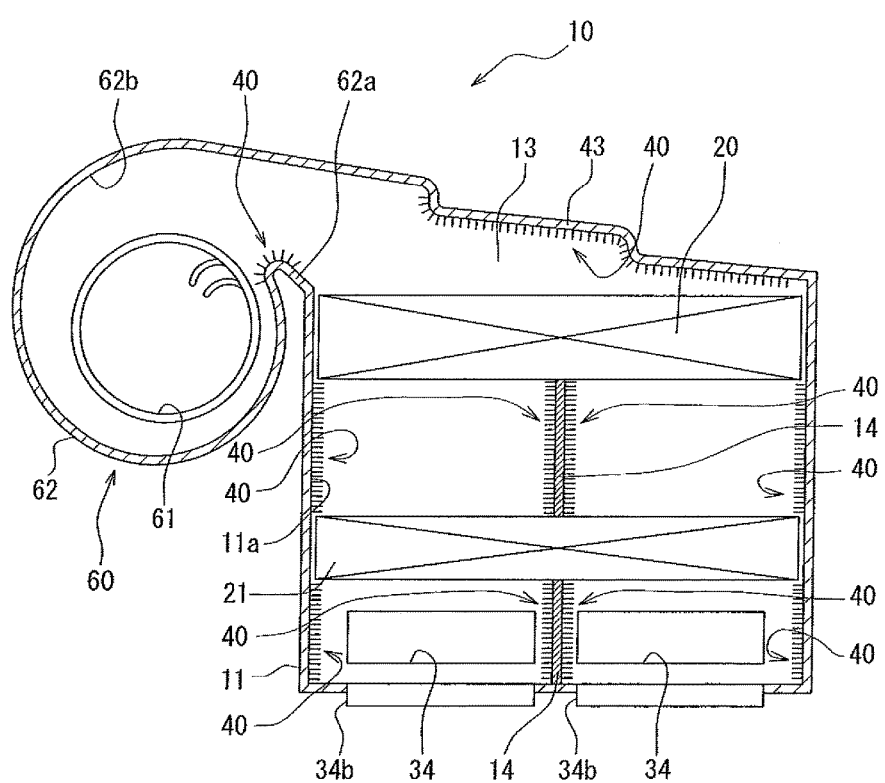
FIG. 1 is a schematic view showing an outline of a structure of an air conditioning apparatus 10 and a blower unit 60, according to a first embodiment of the present invention.

The present invention will be explained by way of multiple embodiments with reference to the drawings. The same reference numerals are used throughout the multiple embodiments for the purpose of designating the same or similar parts and/or portions, so that repeated explanation will be eliminated.

First Embodiment

Figure 2:
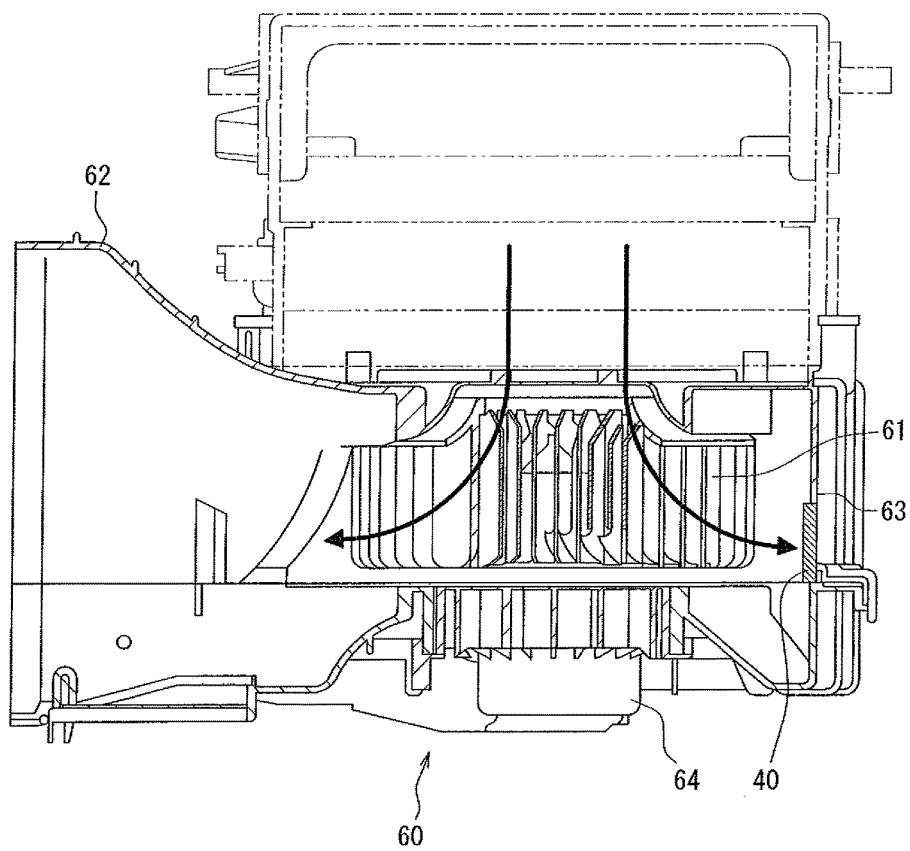
FIG. 2 is a schematic cross sectional view showing the blower unit 60.
Figure 3:
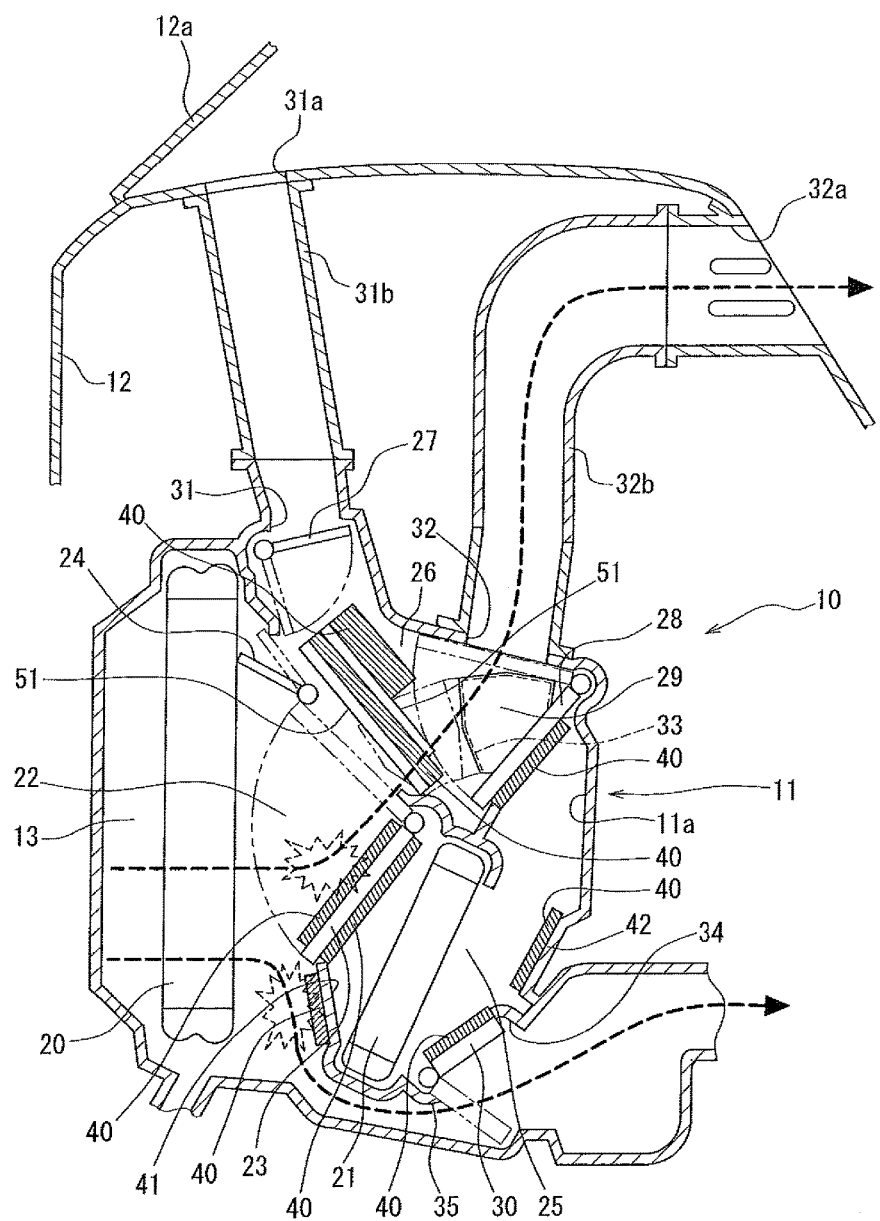
FIG. 3 is a schematic cross sectional view showing the air conditioning apparatus 10 for explaining an operation (a maximum cooling operation)

A first embodiment of the present invention will be explained with reference to FIGS. 1 to 17. FIG. 1 schematically shows an outlined structure of an air conditioning apparatus 10 and a blower unit 60 for a vehicle. FIG. 2 is a cross sectional view showing the blower unit 60. FIG. 3 is a schematic view showing the outlined structure of the air conditioning apparatus 10 for the vehicle. The air conditioning apparatus 10 controls temperature of the air in a passenger compartment of the vehicle.

The air conditioning apparatus 10 (hereinafter, simply referred to as an A/C apparatus) has an air conditioner casing 11 (an A/C casing 11) being composed of an air blowing portion and an air controlling portion. The A/C casing 11 is arranged at a back side of an instrument panel 12 in the passenger compartment of the vehicle. The A/C casing 11 functions as a passage member for forming air passages in an inside thereof. The A/C casing 11 is composed of multiple casing members, which are made of resin (such as, polypropylene) by a resin-molding process. The multiple casing members are integrally fixed to each other by fixing members (such as, metal springs, metal screws and so on), so as to form the A/C casing 11.

The A/C apparatus 10 respectively supplies air-conditioned air into the passenger compartment from duct openings on a left-hand side and a right-hand side of the vehicle. More exactly, the A/C apparatus 10 controls temperature of the air on a driver side and temperature of the air on a passenger side independently from each other, so that a right-and-left independent control for the temperature is realized. A partitioning wall 14 is provided in the inside of the A/C casing 11, in order that the air on the right-hand side and the air on the left-hand side will not be mixed up with each other. Therefore, the inside of the A/C casing 11 is divided into two air passage portions by the partitioning wall 14.

The air blowing portion includes the blower unit 60 for blowing inside air or outside air toward the air controlling portion. An outlet port of the blower unit 60 is connected to an inlet port of an air passage 13 of the air controlling portion. The blower unit 60 is composed of a centrifugal forward curved fan. 61 and a motor 64 for driving the centrifugal fan 61. A periphery of the centrifugal fan 61 is surrounded by a scroll casing 62, which is connected to the air passage 13 through a duct extending in a centrifugal direction of the centrifugal fan 61.

The scroll casing 62 accommodates the centrifugal fan 61 and is a convoluted member for forming a passage for the air, which will be blasted off from the centrifugal fan 61. A nose portion 62a is formed at a wall surface 62b of the scroll casing 62. The nose portion 62a corresponds to a volute tongue of the scroll casing 62.

In the inside of the A/C casing 11, the air controlling portion includes an evaporator 20 covering a whole passage area of the air passage 13 in its cross section, a heater core 21 for heating the air having passed through the evaporator 20, a cold air passage 22, a main air-mix door 23, a sub air-mix door 24 for a defroster, a hot air passage 25, an air-mix chamber 26 in which cold air and hot air are mixed with each other, a defroster door 27, a face door 28, a foot door 29, and a rear door 30. In addition, multiple air blow-out ports 31 to 34 are formed in the A/C ing 11 at a downstream side of the cold air passage 22 and the hot air passage 25. For example, a defroster blow-out port 31, a face blow-out port 32, a first rear blow-out port 34 and a second rear blow-out port 35 are respectively formed at the A/C casing 11. The above doors 23, 24, 27, 28, 29 and 30 are collectively referred to as air switching doors.

The defroster blow-out port 31 is provided at an upper portion of the A/C casing 11 on a vehicle front side. A defroster duct opening 31a, which is one of duct openings opening to the inside of the passenger compartment of the vehicle, is formed at the instrument panel 12 close to a front windshield glass 12a and on the vehicle front side. The defroster blow-out port 31 and the defroster duct opening 31a are connected to each other via a defroster duct 31b so as to blow out the air toward the windshield glass 12a to remove frost from the windshield glass. An opening and/or closing of the defroster blow-out port 31 is controlled by the defroster door 27.

The face blow-out port 32 is provided at the upper portion of the A/C casing 11 on a vehicle rear side. A face duct opening 32a, which is another one of the duct openings opening to the inside of the passenger compartment of the vehicle, is formed at the instrument panel 12 facing to the vehicle driver or a front passenger on the vehicle rear side of the panel. The face blow-out port 32 and the face duct opening 32a are connected to each other via a face duct 32b so as to blow out the air toward an upper body of the vehicle driver or the front passenger. An opening and/or closing of the face blow-out port 32 is controlled by the face door 28.

Each of the first and second rear blow-out ports 34 and 35 is provided at a lower portion of the A/C casing 11 on the vehicle rear side. A rear duct opening (not shown), which is a further one of the duct openings opening to the inside of the passenger compartment of the vehicle, is formed at a portion close to a rear seat. Each of the rear blow-out ports 34 and 35 and each of the rear duct openings are connected to each other via each of rear ducts 34b so as to blowout the air toward the rear seat. An opening area of each rear blow-out port 34, 35 is controlled by the rear door 30. When the first rear blow-out port 34 is opened by the rear door 30, the hot air heated by the heater core 21 flows through the rear duct 34b. When the second rear blow-out port 35 is opened by the rear door 30, the cold air cooled down by the evaporator 20 flows through the rear duct 34b.

The foot blow-out port 33 is provided at the upper portion of the A/C casing 11 but at a position lower than the face blow-out port 32. A foot duct opening (not shown), which is a further one of the duct openings opening to the inside of the passenger compartment of the vehicle, is formed at a portion close to the passenger's feet. The foot blow-out port 33 and the foot duct opening are connected to each other via a foot duct (not shown) so as to blow out the air toward the feet of the vehicle driver and/or the front passenger. An opening area of the foot blow-out port 33 is controlled by the foot door 29.

The respective air blow-out ports 31 to 35 formed in the A/C casing 11 on the left-hand and right-hand sides of the vehicle are symmetric with each other, so that each of the air blow-out ports 31 to 35 respectively supplies the conditioned air to the vehicle driver side and the front passenger side. The conditioned air from each of the air blow-out ports 31 to 35 passes through the respective air ducts 31b, 32b and 34b and blown out from the respective duct openings 31a, 32a, and so on.

Each of the defroster door 27, the face door 28 and the foot door 29 is a plate-type door, which is composed of a rotational shaft and a flat door plate one side of which is rotatably supported by the rotational shaft. The rear door 30 is also a plate-type door having a rotational shaft and a flat door plate, wherein one side of the door plate is likewise rotatably supported by the rotational shaft. Each of operations of the blower unit 60, the air-mix door 23, the sub air-mix door 24 for the defroster, the defroster door 27, the face door 28, the foot door 29 and the rear door controlled by an electronic control unit (not shown).

The evaporator 20 is arranged in the A/C casing 11 on the vehicle front side. The evaporator 20 is a heat exchanger for cooling down the air passing therethrough by vaporizing low-pressure and low-temperature refrigerant, which is depressurized by an expansion valve of a refrigerating cycle, when the air from the blower unit 60 passes through the evaporator 20. The air passing through multiple tubes of the evaporator 20, through which the refrigerant flows, is cooled down and supplied into the cold air passage 22 located at a downstream side of the evaporator 20.

The heater core 21 is arranged in the A/C casing 11 on the vehicle rear side of the evaporator 20. The heater core 21 is a heat exchanger for heating the air passing therethrough by exchanging heat between engine cooling water (hot water) and the air. The heater core 21 is located at a downstream side of the evaporator 20 for covering a part of the air passage in the A/C casing 11.

The sub air-mix door 24 for the defroster is also arranged in the A/C casing 11 on the vehicle rear side of the evaporator 20. The air-mix door 23 opens and/or closes a part of the cold air passage 22, through which the cold air from the evaporator 20 passes. The air-mix door 23 is also arranged in the A/C casing 11 on the vehicle rear side of the evaporator 20. The air-mix door 23 opens and/or closes a main part of the cold air passage 22 and the hot air passage 25, through which the cold air from the evaporator 20 passes.

The air-mix door 23 as well as the sub air-mix door 24 for the defroster controls a flow amount of the hot air passing through the heater core 21 and a flow amount of the cold air not passing through the heater core 21 depending on opening degrees of those doors 23 and 24, so that the temperature of the air is controlled. When the air-mix door 23 and the sub air-mix door 24 are located at positions indicated by solid lines in FIG. 3, the A/C apparatus 10 is in its maximum cooling operation, wherein the hot air passage 25 is closed in order to completely block the air flow toward the heater core 21 and thereby provide the cold air into the passenger compartment. In the condition shown in FIG. 3, a face mode is selected. The air-mix door 23, the sub air-mix door 24, the defroster door 27, the face door 28, the foot door 29 and the rear door 30 are moved to positions (indicated by the respective solid lines) shown in FIG. 3 so as to carry out the face mode operation.

Figure 4:
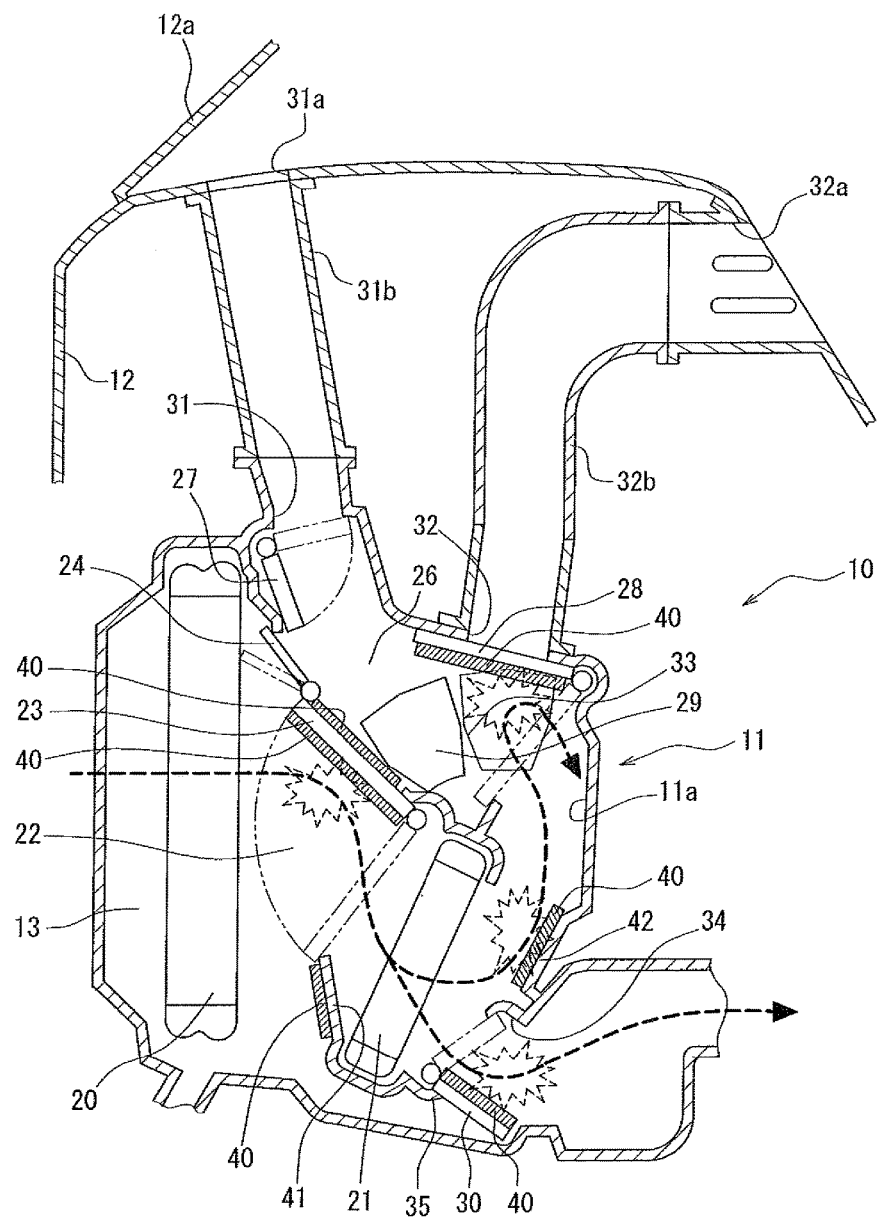
FIG. 4 is also a schematic cross sectional view showing the air conditioning apparatus 10 for explaining the operation (a maximum heating operation)

FIG. 4 is a cross sectional view also showing the structure of the A/C apparatus 10 for the vehicle, wherein the positions of the respective doors are different from those of FIG. 3. When the air-mix door 23 and the sub air-mix door 24 are located at the positions indicated by solid lines in FIG. 4, the A/C apparatus 10 is in its maximum heating operation, wherein the air passage to the air-mix chamber 26 is closed so that all of the air having passed through the evaporator 20 flows to the heater core 21. The air is heated and such hot air is supplied into the passenger compartment.

When the air-mix door 23 and the sub air-mix door 24 are located at such positions, which respectively correspond to intermediate positions between the positions of FIG. 3 and FIG. 4, each of the cold air passage 22 and the hot air passage 25 is partly opened so that both of the cold air and hot air flow in a downstream direction. Those cold air and hot air are mixed up in the air-mix chamber 26, which is formed at an upstream side of the respective air blow-out ports, so that the temperature of such mixed air is controlled and such conditioned air is supplied into the respective air ducts from the respective air blow-out ports to the air duct openings.

The hot air passage 25 is inclined toward the vehicle side and extends from the lower portion of the A/C casing 11 to the upper portion thereof, that is, to the air-mix chamber 26. The hot air passage 25 has a width covering an almost all space in the A/C casing 11 in a horizontal direction of the vehicle. Such a width dimension is larger than a dimension of the hot air passage 25 in a longitudinal direction of the vehicle. In other words, the hot air passage 25 is formed in a flat rectangular space having a smaller thickness in the longitudinal direction but a larger width in the horizontal direction of the vehicle and extending in a vertical direction.

The face blow-out port 32 and the defroster blow-out port 31 are opening to the air-mix chamber 26. The first rear blow-out port 34 is opened to the hot air passage 25. The second rear blow-out port 35 is opened to the air passage extending from the evaporator 20 to a space beneath the heater core 21, through which the cold air not passing through the heater core 21 flows. Therefore, when the rear door 30 is located at the position shown in FIG. 3 (indicated by the solid line), the first rear blow-out port 34 is closed so that the cold air is blown out from the second rear blow-out port 35 into the rear duct. On the other hand, when the rear door 30 is located at the position shown in FIG. 4 (indicated by the solid line), the second rear blow-out port 35 is closed so that the hot air is blown out from the first rear blow-out port 34 into the rear duct.

Figure 5:
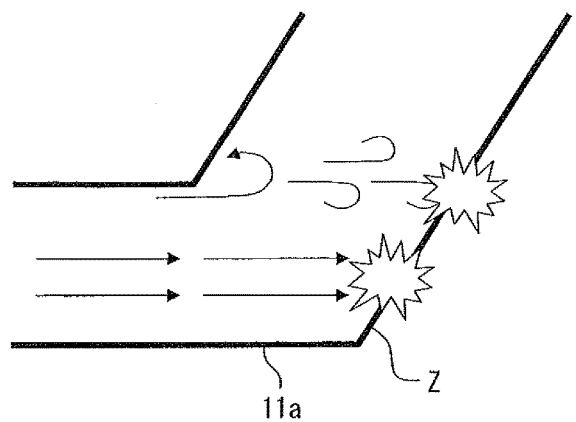
FIG. 5 is a schematic view showing a beaded portion "Z" and air currents at the bended portion.

According to the A/C apparatus 10 of the present invention, aerodynamic sound decreasing members are formed so as to decrease aerodynamic sound generated in the A/C apparatus. At first, mechanism, according to which the aerodynamic sound will be generated, will be explained. FIG. 5 schematically shows air flow at a bended portion "Z" of the air passage. As shown in FIG. 5, at the banded portion "Z", at which the air flow collides against a wall surface 11a, an air current disturbed in an upper stream and/or another air current having broken away from an inner bended portion (opposite to the outer bended portion "Z") and largely disturbed will interfere with (collide against) the wall surface 11a of the outer banded portion "Z", to thereby generate the aerodynamic sound (which is called as vortex sound).

More in detail, when the disturbed air current interferes with (collides against) the wall surface 11a, the air current receives frictional resistance of the wall surface 11a by such interference. The air current has velocity gradient, according to which flow speed of the air current closer to the wall surface 11a becomes lower, while the flow speed becomes higher as the air current is remote far away from the wall surface 11a, to thereby form a boundary layer.

Figure 6:
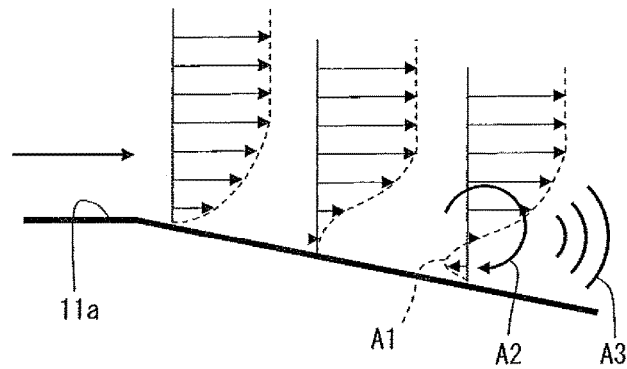
FIG. 6 is a schematic view showing air currents in an air passage which is enlarged in a downward direction.

FIG. 6 schematically shows air currents in the air passage which is gradually enlarged toward a downstream direction. As shown in FIG. 6, in the boundary layer at such a portion, the air passage of which is enlarged, flow energy hardly flows into the air currents adjacent to the wall surface 11a and thereby a back flow A1 is generated at the wall surface 11a of the downstream side. Therefore, the air current breaks away from the wall surface 11a. Then, a swirl A2 is generated, which would cause the aerodynamic sound A3.

Figure 7:
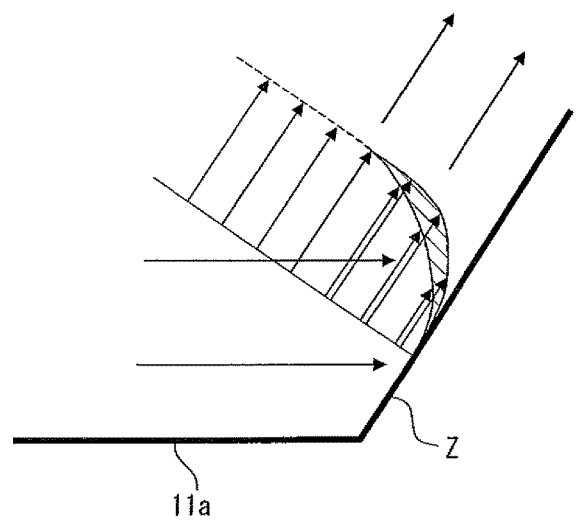
FIG. 7 is a schematic view showing a velocity gradient at the bended portion "Z"

FIG. 7 schematically shows velocity gradient of the air currents at the bended portion "Z". As indicated by a hatched area in FIG. 7, in the boundary layer of the bended portion "Z", at which the air currents collide against the wall surface 11a, the flow energy continuously flows into the boundary layer. Therefore, the air currents do not break away from the wall surface 11a. However, the velocity gradient at the area adjacent to the wall surface 11a (a flow-change with respect to a distance from the wall surface 11a) becomes larger.

Figure 8:
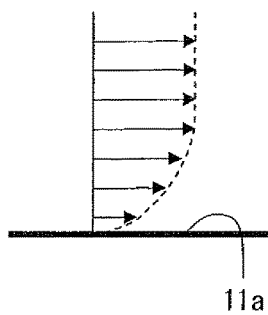
FIG. 8 is a schematic view showing an example of flow velocity.
Figure 9:
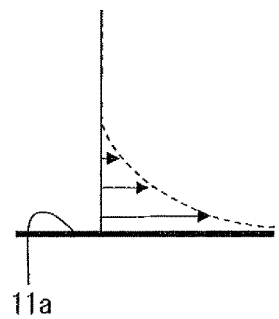
FIG. 9 is a schematic view showing an example of vorticity corresponding to the air currents in FIG. 8.
Figure 10:
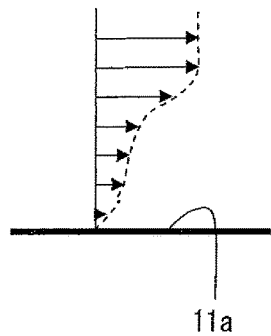
FIG. 10 is a schematic view showing another example of flow velocity.
Figure 11:
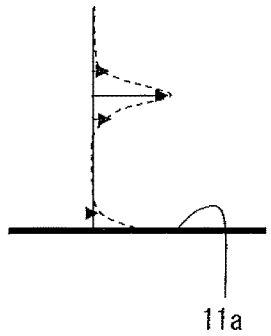
FIG. 11 is a schematic view showing another example of vorticity corresponding to the air currents in FIG. 10.

FIG. 8 shows an example of flow velocity. FIG. 9 shows an example of vorticity corresponding to FIG. 6. FIG. 10 shows another example of the flow velocity. FIG. 11 shows another example of the vorticity corresponding to FIG. 10. As shown in FIG. 8, when the velocity gradient is larger in the area adjacent to the wall surface 11a, the vorticity becomes correspondingly larger in the area adjacent to the wall surface 11a, as shown in FIG. 9. As a result, the sound at the boundary layer becomes larger.

On the other hand, as shown in FIG. 10, when the velocity gradient is maximized in an area away from the wall surface 11a and therefore the velocity gradient is smaller in the area adjacent to the wall surface 11a, the vorticity is maximized in the area away from the wall surface 11a and the vorticity becomes smaller in the area adjacent to the wall surface 11a, as shown in FIG. 11. As a result, the sound at the boundary layer becomes smaller. In other words, the vorticity of the air current which would cause the aerodynamic sound is approximately equivalent to a space derivative value of the flow velocity, that is, a change of the flow velocity with respect to the distance from the wall surface 11a. Accordingly, a larger aerodynamic sound may be generated at the portion, at which the air currents (the velocity gradient of which becomes larger in the area adjacent to the wall surface 11a) interfere with (collide against) the wall surface 11a.

In view of the above mechanism of generating the aerodynamic sound, it is necessary to reduce the vorticity or the area of the vorticity should be separated from the wall surface 11a, in order to decrease the aerodynamic sound. In other words, it is necessary to make the velocity gradient smaller in the area adjacent to the wall surface 11a and the area of the high velocity gradient should be separated from the wall surface 11a, in order to decrease the aerodynamic sound at the portion at which the air currents interfere with (collide against) the wall surface 11a.

The aerodynamic sound decreasing members of the present embodiment are composed of multiple projections 40. The multiple projections 40 are formed on the wall surface of the A/C casing 11 so as to make smaller the velocity gradient of the air colliding against the wall surface 11a. The multiple projections 40 are formed in a predetermined surface portion (s) of at least one of the wall surface 62b of the scroll casing 62 and the inner wall surface 11a of the A/C casing 11. The projections 40 are formed in multiple lines, wherein each of them projects from the surface portion.

Figure 12:
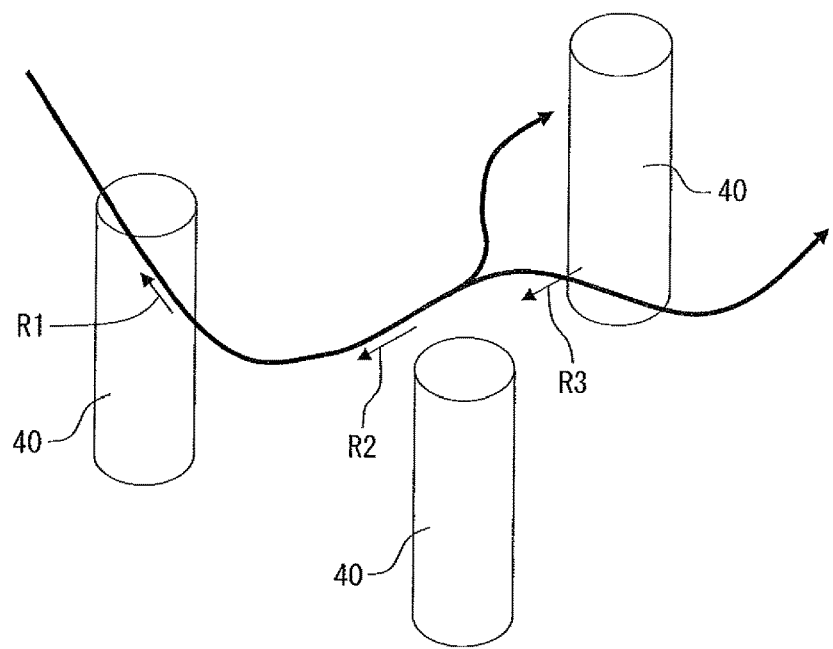
FIG. 12 is a schematic perspective view showing projections 40.
Figure 13:
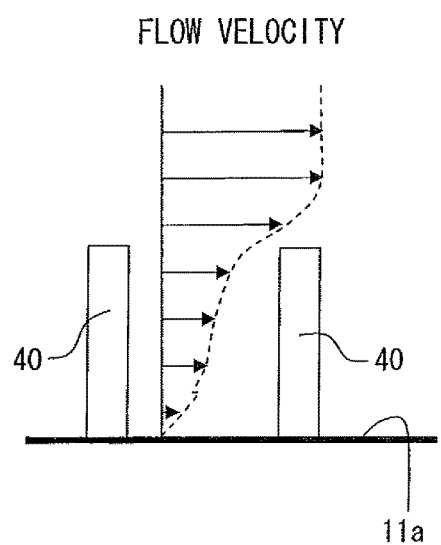
FIG. 13 is a schematic view showing an example of relationship between the multiple projections 40 and the flow velocity.

FIG. 12 is a perspective view schematically showing the multiple projections 40. FIG. 13 is an example showing a relationship between the multiple projections 40 and the air flow velocity. As shown in FIG. 12, when the air passes among the multiple projections 40, there are generated a frictional resistance R1 by the projections 40, a frictional resistance R2 by the wall surface 11a and a pressure loss R3 by the projections 40. As a result, as shown in FIG. 13, the velocity gradient can be made smaller in the area adjacent to the wall surface 11a and the maximum velocity gradient can be shifted toward the area away from the wall surface 11a. As above, the noise can be reduced by the multiple projections 40.

Figure 14:
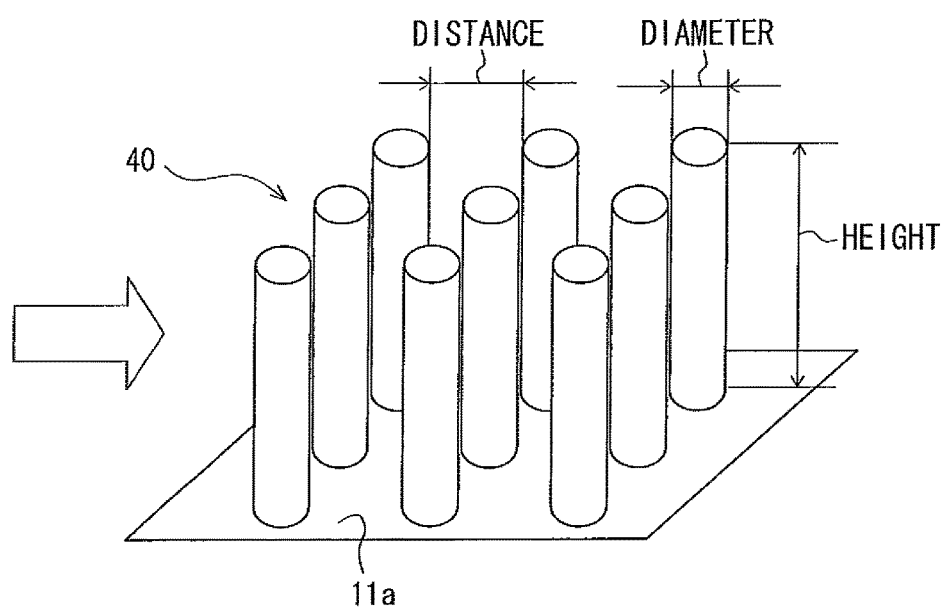
FIG. 14 is a schematic perspective view showing an example (the first embodiment) of the multiple projections 40.

The multiple projections 40 will be further explained more in detail. FIG. 14 is a schematic view showing an example of the multiple projections 40. When the projections 40 are formed on the wall surface 62b of the scroll casing and/or the wall surface 11a of the A/C casing 11, the multiple projections can be integrally formed with the wall surfaces 62b and/or 11a. When the projections 40 are integrally formed with the wall surfaces 62b and/or 11a, the scroll casing 62 and/or the A/C casing 11 as well as the projections 40 are made of the same material. For example, those members (62b, 11a, 40) are integrally formed by an injection molding process. In a similar manner, when the projections 40 are formed on the doors, they can be integrally formed with each other.

The predetermined surface portions (also referred to as a projection-formed portion or a flow-change portion) of the wall surfaces, on which the projections 40 are formed, will be explained. The multiple projections 40 are formed at such portions, at which the air flow direction is changed. In other words, the multiple projections 40 are formed at such portions, at which a shape of the wall surface 11a is changed and at which the velocity gradient of the air flow becomes larger in the area adjacent to the wall surface as a result that the air flow collides against the wall surface 11a. More exactly, the predetermined surface portion corresponds to the portion of the wall surface, at which the shape of the wall surface 11a is changed and against which the air currents collide so as to change the air flow direction. When the wall surface 11a is not straight along the air flow but the air passage is bended or curved, or when the air passage is expanded or reduced, the wall surface 11a is included in the meaning of "the shape of the wall surface 11a is changed".

When the wall surface 11a includes a portion having an angle of attack, with which a flow rate is not decreased by passage resistance, such a portion is also included in the meaning of "the shape of the wall surface 11a is changed". For example, the angle of attack is larger than 30 degrees with respect to a flow direction the air flow. The angle of attack is preferably larger than 45 degrees and most preferably larger than 60 degrees.

The multiple projections 40 are schematically indicated in FIG. 1, while the projections 40 are indicated by hatched portions in FIGS. 2 to 4. As shown in FIGS. 1 to 4, the projections 40 are formed on the wall surface 62b of the scroll casing 62, the wall surface 11a of the A/C casing 11, and on one or both sides of the respective doors 23, 28 and 30.

One of the projection-formed portions (the flow-change portions) for the wall surface 62b of the scroll casing 62, on which the projections 40 are formed, corresponds to the nose portion 62a, as shown in FIG. 1. The air currents are unstable at the nose portion 62a and therefore the directions of the air currents as well as the flow velocity are momentarily changed. The other of the projection-formed portions corresponds to such a portion 63, as shown in FIG. 2, at which the direction of the air flow is changed from an air drawing direction to a centrifugal direction. The other projection-formed portion 63 is a part of the wall surface 62b of the scroll casing 62 on a side (a lower side in FIG. 2) opposite to an air drawing side (an upper side in FIG. 2). In an operation of the blower unit 60, the air is drawn into the centrifugal fan 61 from the air drawing side, pressure of the air is increased in respective spaces between fan blades of the centrifugal fan 61, and pressurized air is pushed out from the fan 61 in the centrifugal direction. Then, the air flows along the scroll casing 62 toward the outlet port. The air inside of the fan 61 collides against a front side periphery of the fan blades and then pushed out from the fan blades in the centrifugal direction, so that such pushed out air collides against the other projection-formed portion 63.

A first projection-formed portion 41 (i.e. a flow-change portion) on the wall surface 11a of the A/C casing 11 corresponds to a part of the casing (a partitioning wall), which is located at the downstream side of the evaporator 20 and opposes to the evaporator 20 (FIGS. 3 and 4). A second projection-formed portion 42 (i.e. a flow-change portion) on the wall surface 11a of the A/C casing 11 corresponds to apart of the casing (a partitioning wall), which is located at the downstream side of the heater core 21 and opposes to the heater core 21 (FIGS. 3 and 4). A third projection-formed portion 43 (i.e. a flow-change portion) on the wall surface 11a of the A/C casing 11 corresponds to a part of the casing (a partitioning portion), into which the air from the blower unit 60 is supplied (FIG. 1). Namely, the third projection-formed portion 43 is a part of the casing, which is located at the upstream side of the evaporator 20 and forms the air passage connected to the scroll casing 62 and at which the air flow direction is changed so that the air flows toward the evaporator 20.

In addition, the projections 40 are formed on respective door surfaces of the face door 28 and the rear door 30 on an inner side thereof, which faces to the inside of the A/C casing 11 (the hot air passage 25) when each of the doors is closed. More exactly, the projections 40 are formed on the door surface of the rear door 30, which faces to the heater core 21 when the rear door 30 closes the first rear blow-out port 34. The multiple projections 40 are further formed on both door surfaces of the air-mix door 23.

A guide plate 51 is provided in the air-mix chamber 26. The guide plate 51 is shown in FIG. 3, but not shown in FIG. 4 for the purpose of simplification, of the drawing. The guide plate 51 is projected from the wall surface 11a for blocking a part of the air flow so as to guide the same. More exactly, in a foot mode operation, during which the air is blown out through the foot blow-out port 33, the temperature of the air as well as the distributed amount of the air is controlled by the guide plate 51. As shown in FIG. 3, in a face mode operation, since the guide plate 51 becomes an obstacle to the air flow, the multiple projections 40 are formed on a plate surface of the guide plate 51 at such a portion, which is on a downstream side and at which the air disturbed by the guide plate 51 collides against. In addition, since the guide plate 51 (in particular, a front side surface) also forms a part of the wall surface 11a of the A/C casing 11, and thereby the air flow collides against the front side surface of the guide plate 51, the multiple projections 40 may be formed on the front side surface. The guide plate 51 controls mixture of the cold air and the hot air (a mixing ratio between them). The guide plate 51 further has a guide portion for avoiding mixture of the cold air and the hot air (the mixing ratio is controlled zero).

Another guide plate may be provided at a portion around the face door 28 and/or the rear door 30 for guiding the air to the respective doors. In such a case, the multiple projections 40 may be formed on a plate surface, against which the air collides and along which the air is guided to the doors.

As above, the multiple projections 40 are formed in several portions on the wall surface 11a of the A/C casing 11. For example, in the cooling operation shown in FIG. 3, as indicated by dotted lines, a part of the air currents having passed through the evaporator 20 collides against the air-mix door 23 and the direction of those air currents is changed to the direction toward the face blow-out port 32. On the other hand, the other part of the air currents having passed through the evaporator 20 collides against the first projection-formed portion 41 and thereby the direction of those air currents is changed to the direction toward the rear duct 34b (FIG. 1). In this operation, since the projections 40 formed on the rear side surfaces of the face door 28 and the air-mix door 23 are not in contact with the air currents, those projections 40 do not cause decrease of the air flow rate.

In the heating operation shown in FIG. 4, as indicated by dotted lines, a part of the air currents having passed through the evaporator 20 collides against the rear side surface of the air-mix door 23 and thereby the direction of those air currents is changed to the direction toward the heater core 21. A part of the air currents having passed through the heater core 21 collides against the second projection-formed portion 42 and thereby the direction of those air currents is changed to the direction toward the foot door 29. The remaining part of the air currents having passed through the heater core 21 collides against the inside surface of the rear door 30 and thereby the direction of those air currents is changed to the direction toward the rear duct opening (not shown). In this operation, since the projections 40 formed on the front side surface of the air-mix door 23 and the first projection-formed portion 41 are not in contact with the air currents, those projections 40 do not cause decrease of the air flow rate.

Figure 15:
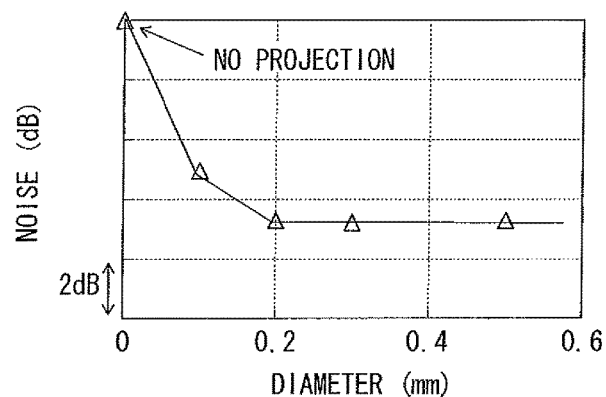
FIG. 15 is a graph showing an example of relationship between a diameter of the projection 40 and noise.
Figure 16:
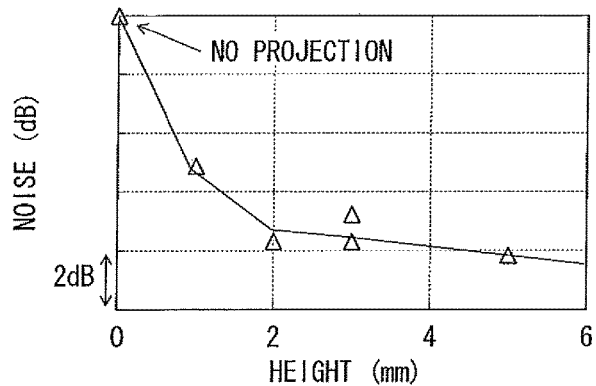
FIG. 16 is a graph showing an example of relationship between a height of the projection 40 and noise.
Figure 17:
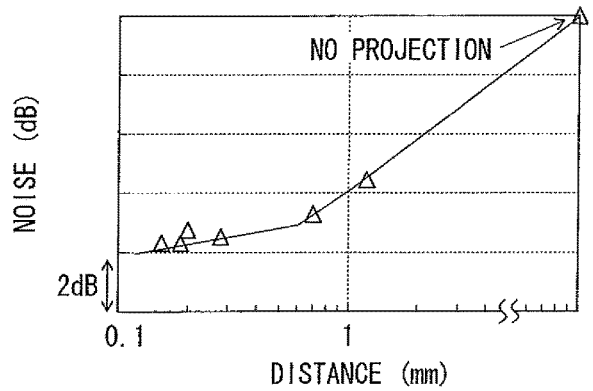
FIG. 17 is a graph showing an example of relationship between a distance of the neighboring projection 40 and noise.

Dimensions and distribution for the projections 40 will be explained with reference to FIGS. 15 to 17. FIG. 15 is a graph showing an example of a relationship between a diameter of the projection 40 and the noise. FIG. 16 is a graph showing an example of a relationship between a height of the projection 40 and the noise. FIG. 17 is a graph showing an example of a relationship between a distance between the projections 40 and the noise. It is necessary to properly set the diameter, the height and the distance of the projections 40 so as to obtain appropriate frictional resistance and the pressure loss, for the purpose of decreasing the velocity gradient in the area adjacent to the wall surface 11a. When the diameter is too small, the frictional resistance can not be sufficiently obtained. Then, the flow velocity in the area adjacent to the wall surface 11a can not be sufficiently decreased. When the height of the projections is too small, the area in which the velocity gradient is maximized can not be sufficiently separated from the wall surface 11a. When the distance between the projections is too large, the sufficient pressure loss can not be obtained. Then, the flow velocity in the area adjacent to the wall surface 11a can not be sufficiently decreased, either. In the example shown in FIGS. 15 to 17, the projections of a cylindrical shape as shown in FIG. 14 are formed on the wall surface 11a, wherein the noise is measured when the air flow velocity is 5 m/s and the angle of attack is 90 degrees.

At first, the diameter will be explained. According to the example of FIG. 15, the height of the projection 40 is set to be 3 mm, the distance between the projections 40 is set to be 0.7 mm, and the diameter of the projection 40 is varied. As shown in FIG. 15, the noise level becomes lower when the projections 40 are formed. It is preferable when the diameter of the projection 40 is larger than 0.1 mm, and more preferable when it is larger than 0.2 mm.

Next, the height will be explained. According to the example of FIG. 16, the diameter of the projection 40 is set to be 0.5 mm, the distance between the projections 40 is set to be 0.7 mm, and the height of the projection 40 is varied. As shown in FIG. 16, the noise level becomes lower when the projections 40 are formed. It is preferable when the height of the projection 40 is larger than 1 mm, and more preferable when it is larger than 2 mm.

Now, the distance between the projections 40 will be explained. According to the example of FIG. 17, the diameter of the projection 40 is set to be 0.5 ma, the height of the projection 40 is set to be 3 mm, and the distance between the projections 40 is varied. In FIG. 17, when the distance between the projections 40 is infinite, it is regarded as a situation that the projections are not formed. As shown in FIG. 17, the noise level becomes lower when the projections 40 are formed. It is preferable when the distance between the projections 40 is smaller than 1 mm, and more preferable when it is less than 0.5 mm.

As explained above, according to the present embodiment, the multiple projections 40 are formed on the projection-formed portions (the flow-chance portions) of the wall surface 11a, such as the first projection-formed portion 41, at which the air flow direction is changed. According to the researches of the present inventors, the decrease of the flow rate is relatively large on the wall surface 11a having small angle of attack, for example, in the case of the air currents along the wall surface. On the other hand, the flow rate will not be substantially decreased in such a portion, where the angle of attack is large when the air flow direction is changed and thereby the air currents collide against each other. In addition, the aerodynamic sound is generated when the swirls produced by the disturbance of the air currents are transformed. The multiple projections 40 decrease the generation of the aerodynamic sound by suppressing the deformation of the swirls. Accordingly, the effect for decreasing the noise is not large, when the projections are formed on such portions of the wall surface 11a, at which the disturbance of the air currents may not largely take place (namely, the air currents smoothly flow on the wall surface 11a).

According to the present embodiment, the multiple projections 40 are formed on such portions of the wall surfaces 11a (i.e. the flow-change portions), at which the velocity gradient of the air flow becomes larger in the area adjacent to the wall surface 11a. As a result, the aerodynamic sound, which is generated by the disturbance of the air currents, can be decreased as shown in FIGS. 15 to 17. In addition, since the air passage area of those portions (the flow-change portions) at which the air currents collide against the projection-formed surfaces is not reduced, and since the frictional resistance of the projection-formed surface will not be extremely increased, not only the noise generated by the collision of the air currents can be decreased, but also the aerodynamic sound generated by the disturbance of the air currents can be effectively decreased without causing the decrease of the flow rate. In addition, since the multiple projections 40 are formed not on the whole area of the wall surface 11a but on the part thereof, an increase of the manufacturing cost can be suppressed. As above, according to the present embodiment, the aerodynamic sound can be decreased, while the decrease of the flow rate as well as the increase of the manufacturing cost is avoided.

According to the present embodiment, when compared with the conventional acoustic absorbing material and/or sound absorber, the aerodynamic sound decreasing members can be formed in a simpler and smaller-sized (thinner) structure by the multiple projections. It is further possible to decrease the noise in a wide range of frequency. In the case of the air conditioning apparatus for the vehicle, a small-sized structure is always required for easily mounting the A/C apparatus in the vehicle, and the noise is generated in the wide range of the frequency. Therefore, the present invention can be preferably applied to the A/C apparatus for the vehicle.

According to the present embodiment, the face door 28, the rear door 30, and so on are provided in the A/C casing 11 for opening and closing the air passages. In case of those doors 28 and 30, the air currents collide against one of the surfaces (the front or rear side surface) of each of those doors and the direction of the air flow is changed. Therefore, when the multiple projections 40 are formed on the surfaces of the doors 28 and 30, it is possible to suppress the generation of the swirl deformation and thereby to decrease the aerodynamic sound.

According to the present embodiment, the multiple projections 40 are formed on the doors (such as, the face door 28, the rear door 30) for opening and/or closing the air ducts connecting the inside of the A/C casing 11 with the passenger compartment. When those doors are in the closed condition, the air currents collide against the door surfaces on the side facing to the inside of the A/C casing 11 and thereby the air flow direction is changed. Since the multiple projections 40 are formed on such door surfaces, it is possible to suppress the deformation of the generated swirls to thereby decrease the aerodynamic sound. On the other hand, when the doors are in the opened condition, the air currents flow along the door surfaces, which will be the outer side surfaces of the A/C casing 11 and on which the projections 40 are not formed. Therefore, the flow rate will not be decreased.

According to the present embodiment, the multiple projections 40 are also formed on the plate surface of the guide plate 51 in the air-mix chamber 26 (which is formed on the wall surface 11a of the A/C casing 11) as well as on the wall surface 11a at the downstream side of the guide plate 51. The guide plate 51 mixes the cold air and the hot air for the purpose of controlling the temperature of the air. Therefore, the air currents collide against the guide plate 51. Furthermore, in the cooling operation, the guide plate 51 guides the cold air toward the face door 28. The guide plate 51 changes the direction of the air flow so as to guide the hot air toward the defroster door without mixing the cold air and the hot air with each other. When the multiple projections 40 are formed on the above guide plate 51, the generation of the aerodynamic sound can be suppressed.

According to the present embodiment, the multiple projections 40 are formed on the door surfaces of the air-mix door 23. The air-mix door 23 adjusts the mixing ratio between the cold air and the hot air depending on the opening degree thereof. The air currents collide against at least one of the door surfaces depending on the opening position thereof, so that the direction of the air flow is changed. When the multiple projections 40 are formed on the door surfaces of the air-mix door 23, the generation of the aerodynamic sound can be suppressed.

In addition, according to the present embodiment, the multiple projections 40 are formed on the first and second projection-formed portions 41 and 42, each of which is located at the downstream side of the heat exchanger, such as the evaporator 20, the heater core 21, and opposes to the heat exchanger. The air having passed through the heat exchanger 20 or 21 collides against the first or the second projection-formed portion 41 or 42. Therefore, the generation of the aerodynamic sound can be suppressed, when the multiple projections 40 are formed on such projection-formed portions.

In addition, according to the present embodiment, the multiple projections 40 are formed on the third projection-formed portion 43, which corresponds to the portion of the wall surface 11a of the A/C casing 11 and to which the air from the blower unit 60 is supplied for the first time. The flow rate in this portion is relatively high. Therefore, the generation of the aerodynamic sound can be suppressed, when the multiple projections 40 are formed on such projection-formed portion.

According to the A/C apparatus 10 for the vehicle, as shown in FIG. 1, stepped portions are formed in the scroll casing 62 (a connecting portion between the blower unit 60 and the A/C casing 11) so as to equally supply the air from the blower unit 60 toward the evaporator 20. The aerodynamic sound is generated at such stepped portions by the collision of the air currents. Accordingly, the multiple projections 40 are formed on the connecting portion between the blower unit 60 and the evaporator 20 (the third projection-formed portion 43), so that the aerodynamic sound can be effectively decreased.

Furthermore, according to the present embodiment, the multiple projections 40 are formed on the projection-formed portion 63 of the wall surface 62b of the scroll casing 62. According to the centrifugal-type blower unit 60, the air currents are pushed out in the centrifugal form and collide against the scroll casing 62, and the air currents flow toward the cutlet port which is gradually expanded. When the air currents are pushed out in the centrifugal form, the direction of the air currents is changed from the air drawing direction (the axial direction) to the radial direction. Therefore, the air currents collide against the portion of the wall surface of the scroll casing 62, which is located on the side (the lower side in FIG. 2) opposite to the air drawing side (the upper side in FIG. 2). Accordingly, when the multiple projections 40 are formed on such portion 63 of the scroll casing 62, the aerodynamic sound can be decreased. Since the multiple projections 40 are formed only on the limited portion 63 of the scroll casing 62, it is possible to suppress the excessive increase of the frictional resistance between the air currents and the wall surface. Therefore, the decrease or the flow rate can be avoided.

According to the present embodiment, the multiple projections 40 are further formed on the nose portion 62a, which is one part of the wall surface 62b of the scroll casing 62 and corresponds to the volute tongue of the scroll casing 62. The air currents are unstable at the nose portion 62a and therefore the directions of the air currents as well as the flow velocity are momentarily changed. Therefore, the aerodynamic sound can be decreased when the multiple projections 40 are formed on such wall surface portion of the nose portion 62a.

According to the present embodiment, as explained above, it is possible to decrease the aerodynamic sound, while the increase of the manufacturing cost is suppressed, while the durability is maintained, and while the decrease of the flow rate is avoided. More exactly, it as possible to provide the aerodynamic sound decreasing apparatus, which can be preferably applied to the A/C apparatus for the vehicle having the air passages including the bended portions.

Second Embodiment

Figure 18:
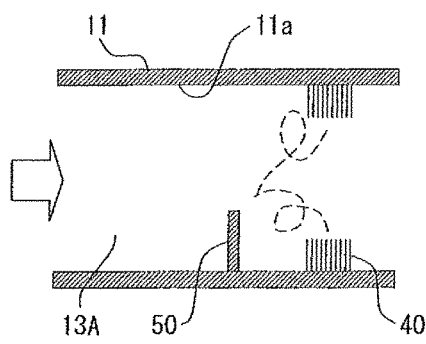
FIG. 18 is a schematic cross sectional view showing an air passage 13A according to a second embodiment.

A second embodiment will be explained with reference to FIG. 18. FIG. 18 is a cross sectional view schematically showing simplified air passage 13A. A blocking plate 50 is provided on the wall surface of the air passage 13A, wherein the blocking plate 50 is projecting from the wall surface 11a toward the inside of the air passage 13A so that it blocks a part of the air currents passing through the air passage. This kind of plate 50 is provided, for example, for increasing mechanical strength or for any other reasons in view of design of various connecting portions. The multiple projections 40 are formed on the wall surface 11a at a downstream side of the blocking plate 50 (also referred to as a flow-change portion), against which the air currents disturbed by the blocking plate 50 collide. More exactly, the multiple projections 40 are formed on such portions of the wall surface 11a at a distance from the blocking plate 50, that is, on the same side of the wall surface 11a to the blocking plate 50 and on the opposite side thereof. According to such a structure (the multiple projections 40), the sound generated by the air currents (disturbed by the blocking plate 50) can be decreased when colliding against the flow-change portions of the wall surface 11a.

Third Embodiment

Figure 19:
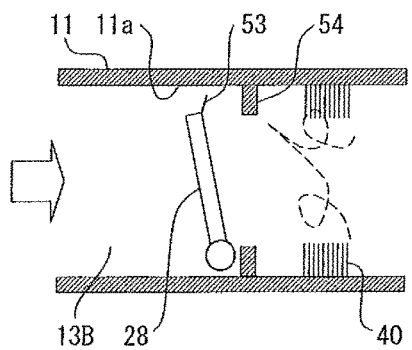
FIG. 19 is a schematic cross sectional view showing an air passage 13B according to a third embodiment.

A third embodiment will be explained with reference to FIG. 19. FIG. 19 is a cross sectional view schematically showing a simplified air passage 13S. Sealing portions 54 are provided on the wall surface 11a of the air passage 13S, wherein the sealing portions 54 are projecting from the wall surface 11a toward the inside of the air passage 13B so that each of the sealing portions 54 blocks a part of the air currents passing through the air passage. In case of the face door 28, an elastic lip seal member 53 is further provided at an outer periphery of the door plate (an upper side periphery in the drawing), so that the lip seal member 53 is brought into contact with the sealing portion 54, when the face door 28 is closed. The sealing portions 54 correspond to such portions, which are in contact with the surface of the face door 28 (the surface of the lip seal member 53), when the face door 28 is closed to shut off the air passage communicating the inside of the A/C casing 11 with the passenger compartment. Therefore, the lip seal member 53 is brought into air-tight contact with the sealing portions 54 when the face door 28 is closed, so that the air passage connecting to the face blow-out port 32 can be surely shut off.

The multiple projections 40 are provided on the wall surface 11a (the flow-change portions) at the downstream side of the sealing portions 54, so that the air currents disturbed by the sealing portions 54 collide against the multiple projections 40. As in the same manner to the second embodiment, the sound generated by the air currents (disturbed by the sealing portions 54) can be decreased when colliding against the flow-change portions of the wall surface 11a.

Fourth Embodiment

Figure 20:
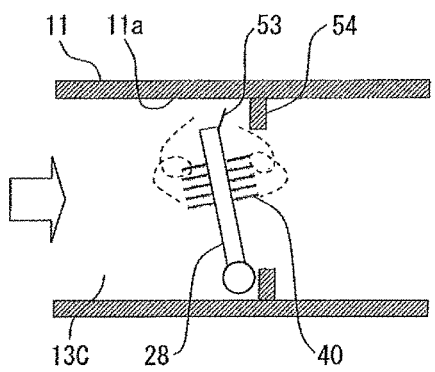
FIG. 20 is a schematic cross sectional view showing an air passage 13C according to a fourth embodiment.

A fourth embodiment will be explained with reference to FIG. 20. FIG. 20 is a cross sectional view schematically showing a simplified air passage 13C. As in the same manner to the third embodiment, the sealing portions 54 and the lip seal member 53 are provided. The multiple projections 40 are formed on such plate surface portions of the face door 28 (the flow-change portion) against which the air currents disturbed by the lip seal member 53 collide when the face door 28 is opened. Accordingly, in the same manner to the first embodiment, the sound, which is generated by the air currents (which are disturbed by the lip seal member 53) when colliding against the face door 28, can be decreased.

The invention of the present embodiment should not be limited to such door having the lip seal member 53, but may be applied to the face door 28 not having the lip seal member 53. In other words, the multiple projections may be provided on the portions of the face door 28, against which the air currents disturbed by the outer periphery of the face door collide. Therefore, the word "the outer peripheral portion of the door" includes not only the outer periphery of the lip seal member in the case of the door having the lip seal member but also the outer periphery of the door itself in the case of the door not having such lip seal member.

Fifth Embodiment

Figure 21:
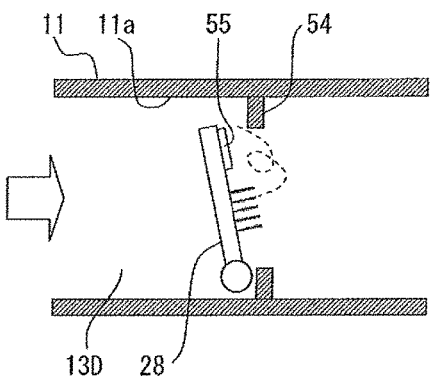
FIG. 21 is a schematic cross sectional view showing an air passage 13D according to a fifth embodiment.

A fifth embodiment will be explained with reference to FIG. 21. FIG. 21 is a cross sectional view schematically showing a simplified air passage 13D. A rib 55 is provided on the door surface of the face door 28 for the purpose of reinforcing the door, wherein the rib 55 is projecting from the door surface. Rigidity of the face door 28 is increased so that a secular change can be suppressed.

The multiple projections 40 are formed on such a plate surface portion of the face door 28 (the flow-change portion), against which the air currents disturbed by the rib 55 collide when the face door 28 is opened. Accordingly, as in the same manner to the first embodiment, the sound, which is generated by the air currents (disturbed by the rib 55) when colliding against the face door 28, can be decreased.

Sixth Embodiment

Figure 22:
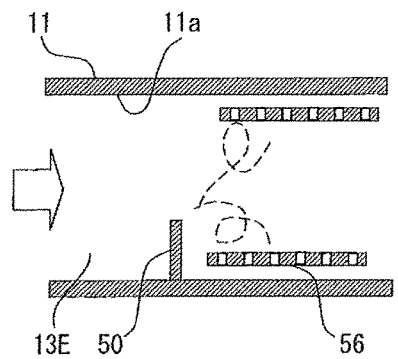
FIG. 22 is a schematic cross sectional view showing an air passage 13E according to a sixth embodiment.

A sixth embodiment will be explained with reference to FIG. 22. FIG. 22 is a cross sectional view schematically showing a simplified air passage 13E. According to the present embodiment, the aerodynamic sound decreasing member is composed of not the projections 40 but plate members 56. As in the same manner to the second embodiment, the blocking plate 50 is provided on the wall surface of the air passage 13E. The plate members 56 are provided in the air passage 13E at such portions (the flow-change portions), which are on the downstream side of the blocking plate 50 and at which the air currents disturbed by the blocking plate 50 collide against the plate members 56. Multiple through-holes 56a are formed in each plate member 56. Each of the plate members 56 is so arranged in the air passage 13E at the portions separated from the wall surface 11a and extends along the wall surface 11a. According to such a structure, an air layer is formed between the plate members 56 and the wall surface 11a. Therefore, the frictional resistance as well as the pressure resistance (the pressure loss) is generated in the air flow by the plate members 56 and the through-holes 56a, in addition to the frictional resistance generated by the wall surface 11a. As a result, flow velocity is low in the plate members 56, while the flow velocity is increased in the area adjacent to the plate members 56. Namely, the velocity gradient becomes smaller in the area adjacent to the wall surface 11a, while the velocity gradient is maximized in the area separated from the wall surface 11a. Accordingly, since the vorticity, which will cause the aerodynamic sound, becomes smaller and the area of the maximum vorticity is separated from the wall surface 11a, the noise (the aerodynamic sound) can be decreased.

For the purpose of making smaller the velocity gradient in the area adjacent to the wall surface 11a, it is necessary to properly set a size of the through-hole 56a, a thickness of the air layer, a distance between the neighboring through-holes so as to obtain appropriate frictional resistance and pressure resistance by the plate members 56. When the size of the through-hole 56a is too large, sufficient frictional resistance can not be obtained. Then, the flow velocity of the air currents in the area adjacent to the wall surface 11a will not be substantially decreased. When the air layer is too thin, the area for the maximum velocity gradient can not be sufficiently separated from the wall surface 11a. When the distance between the through-holes 56a is too large, the sufficient pressure resistance can not be obtained. Namely, the flow velocity in the area adjacent to the wall surface 11a can not be sufficiently decreased.

When the plate members 56 are provided in the air passage 13E, the sound can be decreased like the multiple projections 40. The position for the plate members 56 should not be limited to the su position of the present embodiment. For example, the plate members 56 may be provided at such positions (the flow-change portions) of the above first to fifth embodiments, at which the multiple projections 40 are formed. The plate member may be formed in a net shape, in which multiple wires are netted.

(Further Modifications)

The present invention should not be limited to the above embodiments, but may be modified in various manners without departing from the spirit of the invention, as explained below:

According to the first embodiment, the projection 40 is formed in the columnar shape. However, the shape of the projection should not be limited thereto. FIGS. 23 to 37 are perspective views, each of which shows a modification of the projection 40.

Figure 23:
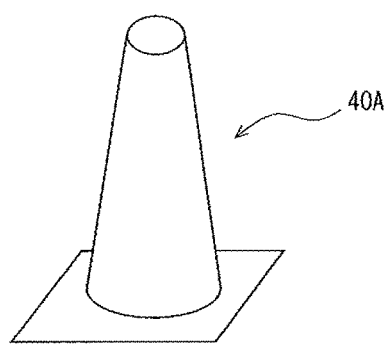
FIGS. 23 to 37 are schematic perspective views, respectively showing a first to a fifteenth modification of the projection.

FIG. 23 shows a first modification, according to which a projection. 40A is formed in a shape of a frustum of a cone, wherein a root portion is enlarged.

Figure 24:
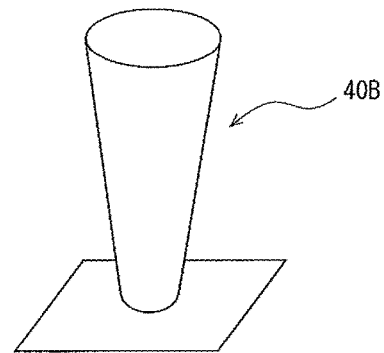

FIG. 24 shows a second modification, according to which a projection 40B is formed in a shape of a frustum of a cone, wherein a root portion is made smaller.

Figure 25:
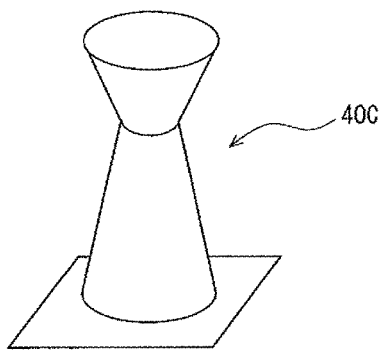

FIG. 25 shows a third modification, according to which a projection 40C is formed in a shape of a column, wherein a middle portion is made smaller.

Figure 26:
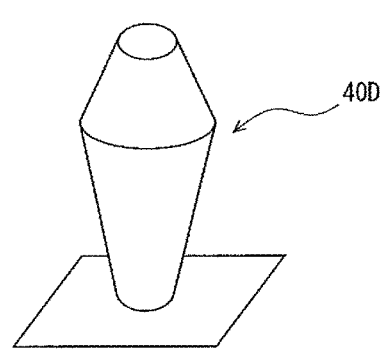

FIG. 26 shows a fourth modification, according to which a projection 40D is formed in a shape of a column, wherein a middle portion is enlarged.

Figure 27:
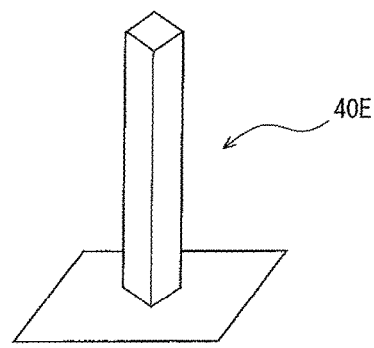

FIG. 27 shows a fifth modification, according to which a projection 40E is formed in a shape of a square pole.

Figure 28:
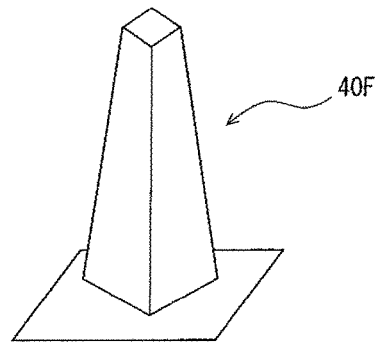

FIG. 28 shows a sixth modification, according to which a projection 40F is formed in a shape of a frustum of a quadrangular pyramid, wherein a root thereof is enlarged.

Figure 29:
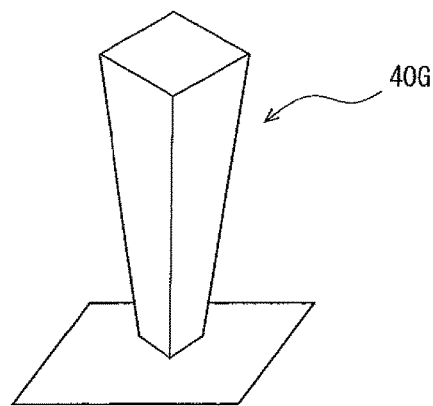

FIG. 29 shows a seventh modification, according to which a projection 40G is formed in a shape of a frustum of a quadrangular pyramid, wherein a root thereof is made smaller.

Figure 30:
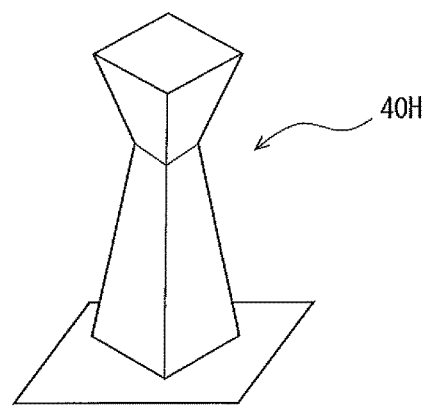

FIG. 30 shows an eighth modification, according to which a projection 40H is formed in a shape of a square pole, wherein a middle portion is made smaller.

Figure 31:
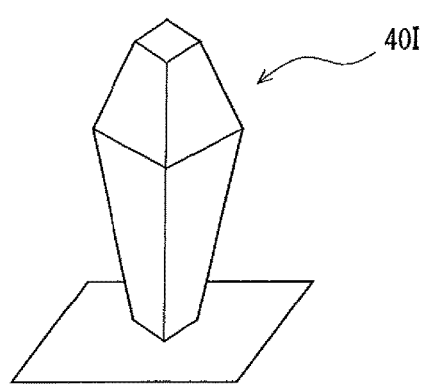

FIG. 31 shows a ninth modification, according to which a projection 40I is formed in a shape of a square pole, wherein a middle portion is enlarged.

Figure 32:
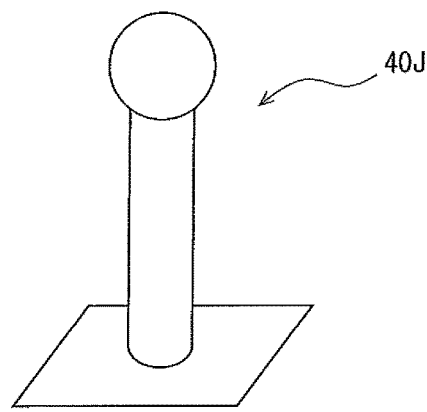

FIG. 32 shows a tenth modification, according to which a projection 40J is formed in a columnar shape, wherein a hall-shaped portion is formed at a forward end of the projection.

Figure 33:
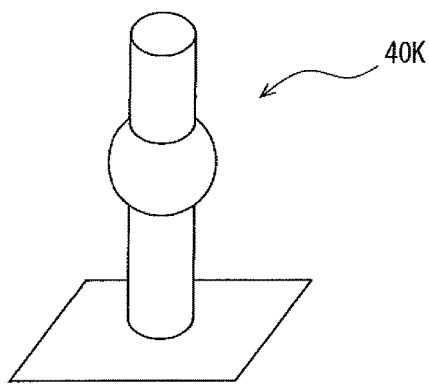

FIG. 33 shows an eleventh modification, according to which a projection 40K is formed in a columnar shape, wherein a ball-shaped portion is formed at a middle of the projection.

Figure 34:
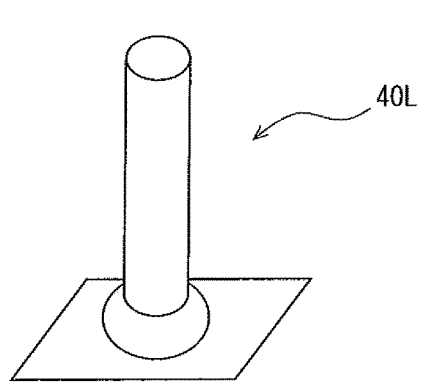

FIG. 34 shows a twelfth modification, according to which a projection 40L is formed in a columnar shape, wherein a half ball-shaped portion is formed at a root of the projection.

Figure 35:
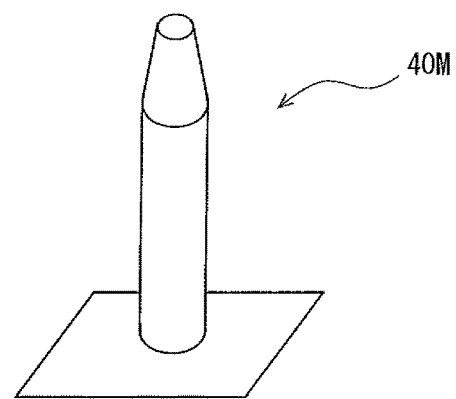

FIG. 35 shows a thirteenth modification, according to which a projection 40M is formed in a columnar shape, wherein a forward end thereof is tapered off.

Figure 36:
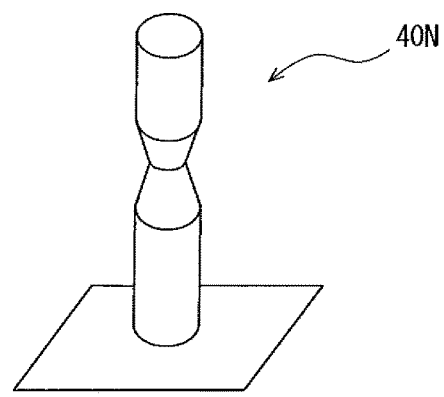

FIG. 36 shows a fourteenth modification, according to which a projection 40N is formed in a columnar shape, wherein a middle portion is tapered so as to become smaller.

Figure 37:
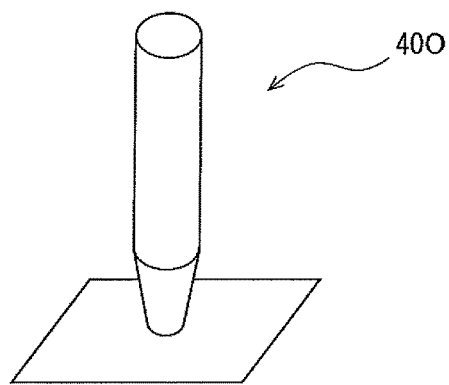

FIG. 37 shows a fifteenth modification, according to which a projection 40O is formed in a columnar shape, wherein a root end thereof is tapered off.

As explained with reference to FIGS. 23 to 37, the cross section of the projection may be formed in any kinds of shapes, such as a circular, an ellipse, a polygon or the like. A concave portion or a convex portion may be formed at the forward end, the middle portion or the root of the projection. The forward end surface of the projection is not limited to the surface, which is in parallel to the wall surface 11a. The forward end surface of the projection may be inclined with respect to the wall surface. The projection may be formed on the wall surface not at a right angle thereto but at an angle other than 90 degrees (in other words, the projection may be inclined with respect to the wall surface 11a). The multiple projections 40 should not be necessarily formed in a matrix form, but may be formed in a staggered form, in a grid pattern, in a striped form or the like. Furthermore, the multiple projections may be formed on the wall surface in a random order.

According to the first embodiment, the multiple projections 40 are integrally formed on the wall surface 11a and thereby the projections have rigidity. However, capillaceous members having flexibility can be included in the meaning of the projections, and therefore the capillaceous members may be also provided on the wall surface.

According to the above first embodiment, the aerodynamic sound decreasing members are provided in the A/C apparatus 10 for the vehicle. However, it is not limited to the A/C apparatus for the vehicle, but the present invention may be applied to apparatuses other than the A/C apparatus, for example, an air blowing, apparatus for cooling down various kinds of machines and/or devices.

What is claimed is:

1. An aerodynamic sound decreasing apparatus comprising:
    an air passage formed by a passage forming member having a first wall portion of an upstream side and a second wall portion of a downstream side so that an air current flows through the air passage;
    an aerodynamic sound decreasing member provided on a wall surface of the second wall portion for decreasing a velocity gradient of the air current colliding against the second wall portion; and
    a blocking plate provided on the wall surface at a position between the upstream side and the downstream side so as to project from the wall surface for blocking a part of the air current flowing through the air passage, so that a flow direction of the air current is changed and thereby the air flowing along the first wall portion collides against the second wall portion,
    wherein the aerodynamic sound decreasing member is provided at a downstream-side position of the second wall portion, which is separated from the blocking plate in a downstream direction of the air passage by a predetermined distance,
    wherein the aerodynamic sound decreasing member comprises multiple projections of columnar shapes, each of which is projected from the wall surface in the same direction as the blocking plate,
    wherein the multiple projections are arranged at predetermined intervals in both multiple first lines extending in a first direction of the air current and multiple second lines extending in a second direction perpendicular to the first direction, and
    wherein the aerodynamic sound decreasing member is provided at a portion of the wall surface, which corresponds to a portion of the wall surface at a downstream side of the blocking plate, so that the air current disturbed by the blocking plate collides against the aerodynamic sound decreasing member.

2. The aerodynamic sound decreasing apparatus according to claim 1, wherein
    the predetermined distance corresponds to a distance so that the air current disturbed by the blocking plate collides against the aerodynamic sound decreasing member.

3. The aerodynamic sound decreasing apparatus according to claim 1, wherein
    the aerodynamic sound decreasing member is provided at the portion of the wall surface, which is on the same side to the blocking plate.

4. The aerodynamic sound decreasing apparatus according to claim 3, further comprising
    another aerodynamic sound decreasing member provided at a portion of the wall surface of the second wall portion, which is on the opposite side to the blocking plate.

5. An aerodynamic sound decreasing apparatus comprising:
    an air passage formed by a passage forming member having an upstream-side wall portion and a downstream-side wall portion so that an air current flows through the air passage;
    an aerodynamic sound decreasing member provided on a wall surface of the downstream side wall portion for decreasing a velocity gradient of the air current colliding against the downstream-side wall portion; and
    a blocking plate provided on the wall surface at a position between the upstream-side and the downstream-side wall portions so as to project from the wall surface toward an inside of the downstream-side wall portion, the blocking plate blocking a part of the air current flowing through the air passage,
    wherein the aerodynamic sound decreasing member is provided at a downstream-side position of the downstream-side wall portion, which is separated from the blocking plate in a downstream direction of the air passage by a predetermined distance so that the air current disturbed by the blocking plate collides against the aerodynamic sound decreasing member,
    wherein the aerodynamic sound decreasing member comprises multiple projections of columnar shapes, each of which is projected from the wall surface in the same direction as the blocking plate,
    wherein the multiple projections are arranged at predetermined intervals in both multiple first lines extending in a first direction of the air current and multiple second lines extending in a second direction perpendicular to the first direction.

* * * * *